United States Patent [19]
Poague

[11] Patent Number: 5,853,811
[45] Date of Patent: Dec. 29, 1998

[54] SPRAY SHIELD

[76] Inventor: David Poague, P.O. Box 2038, Manassas, Va. 22110

[21] Appl. No.: 901,623

[22] Filed: Jul. 28, 1997

Related U.S. Application Data

[62] Division of Ser. No. 581,216, Dec. 29, 1995, Pat. No. 5,688,329.

[51] Int. Cl.⁶ ............................. B05D 1/02; B05D 1/32; B05B 1/28
[52] U.S. Cl. .......................... 427/421; 427/282; 427/300; 118/326; 118/501; 118/504; 118/505; 118/DIG. 7
[58] Field of Search ................... 427/282, 300, 427/421; 118/501, 504, 505, 326, DIG. 7

[56] References Cited

U.S. PATENT DOCUMENTS

| | | | |
|---|---|---|---|
| 1,223,809 | 4/1917 | Lillibridge . | |
| 1,940,328 | 12/1933 | Schrotenboer | D6/310 |
| 2,332,579 | 10/1943 | Kirby | 118/505 |
| 3,528,388 | 9/1970 | McLain | 118/504 |
| 3,565,038 | 2/1971 | Van Barriger | 118/504 |
| 4,052,815 | 10/1977 | Clark | 47/1 R |
| 4,276,852 | 7/1981 | Adams | 118/326 |
| 4,325,323 | 4/1982 | Rioux | 118/504 |
| 4,982,694 | 1/1991 | Moriyama | 118/697 |
| 5,407,630 | 4/1995 | Smith | 264/516 |

*Primary Examiner*—Shrive Beck
*Assistant Examiner*—Michael Barr

[57] ABSTRACT

The present invention is directed to a shield fabricated from a sheet of material having a trough disposed on the lower edge and peripheral flanges disposed about the remaining edges for confining excess spray/mist when positioned rearwardly of an object being painted, cleaned or otherwise treated, and directing it to the trough where it is collected and discharged. More specifically, the shield is fabricated from any of a variety of materials including cardboard, plastic, tin, stainless steel, etc., may optionally be provided with a coating to enhance the flow of the excess spray/mist downwardly into the trough, and is provided with means for suspending, staking or wedging the same onto support means during use.

19 Claims, 4 Drawing Sheets

SPRAY SHIELD

RELATED APPLICATION

This is a division of Ser. No. 08/581,216 filed on Dec. 29, 1995 entitled "Spray Shield," now U.S. Pat. No. 5,688,329 issued on Nov. 18, 1997.

BACKGROUND OF THE INVENTION

The present invention concerns itself with treating surfaces with sprayable material and confining the excess spray which can cause damage to other structure, plants, etc. if discharged into the atmosphere. Shields for protecting adjacent or nearby surfaces are well documented in the prior art and, in the course of a search in the United States Patent Office, U.S. Pat. No. 4,005,678 was deemed to be the nearest to that of the present invention. The shield of this patent is comprised of a planar spray-engaging surface having a spray-collecting trough at the lower edge thereof from where it is disposed. The shield of the present invention is an improvement over said shield in that it provides a spray-containing flange disposed therearound along with means to support the same in vertical as well as other positions during use.

These features were not contemplated by the patentee of U.S. Pat. No. 4,005,678 in that the shield thereof is obviously designed for light-duty spraying, such as house plant treatments, and has no means for stabilizing the same in a vertical or other position for heavy-duty spraying as is the case in the present invention.

SUMMARY OF THE INVENTION

The present invention is directed to a shield which is designed to confine and collect excess spray in a simple and efficient manner when treating an object. Simply, the shield is comprised of a planar sheet of any suitable material having a peripheral guard means and a collection trough disposed thereon, and means associated therewith for supporting the same in various use positions. The invention also contemplates various methods of and materials for making the same.

DESCRIPTION OF THE INVENTION

Figure 1:
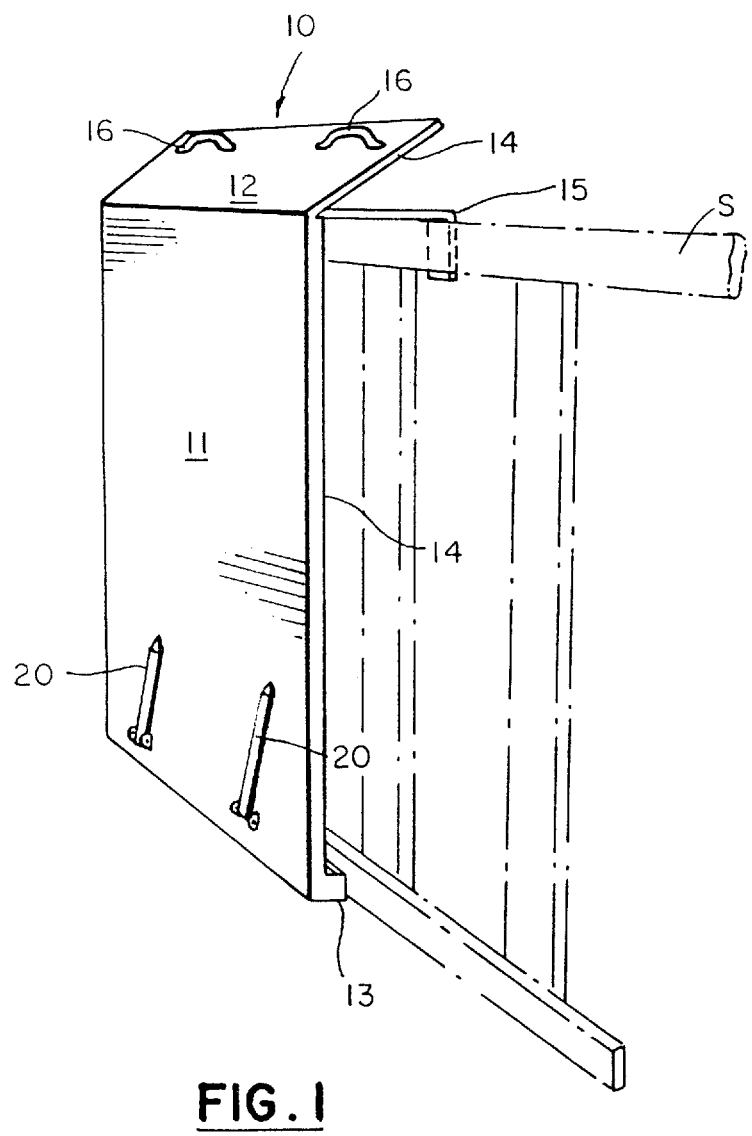
FIG. 1 is a perspective view of the shield in its use position.
Figure 2:
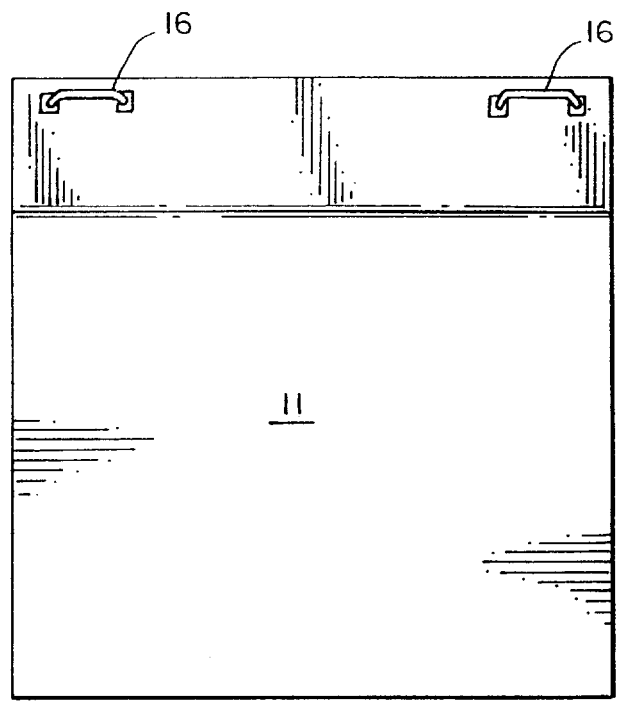
FIG. 2 is a rear view of the shield.
Figure 3:
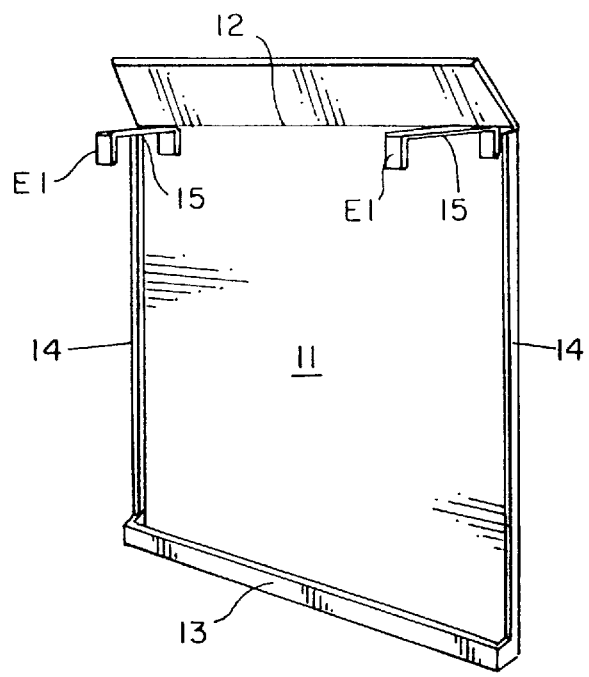
FIG. 3 is a front view of the shield.

With reference to FIGS. 1, 2 and 3 of the drawings, the shield of the present invention is designated generally as 10, and is seen to include a generally planar sheet of material 11 having an upper angled outwardly extending section 12 coextensive therewith, a trough 13 extending along the lower edge thereof, peripheral flange means 14 extending along the edges of the sheet, spaced support engaging arms 15,15 extending beneath and outwardly in the same direction as said angled section 12, and handle means 16,16 on the outer surface of said section 12 to facilitate handling of the shield 10. As seen in these Figures and to use the shield 10, the user grasps the handles 16,16 lifts the same and disposes the support arms 15,15 with its downturned ends E1,E1 (FIG. 3), over a surface S to be treated, with the ends engaging the same for supporting the shield therefrom. In this instance and merely by way of example, the support surface S is a top rail of a railing, fence, or the like which is to be treated. The user then directs the spray of material which can be paint, cleaning or treatment solution, etc. against the same whereby the excess spray is directed against the surface 11 with the peripheral guard 14 confining the excess spray therewithin and directs the same downwardly into the trough 13 where it is collected for disposal or reuse. After this section is treated, the shield is moved along the support surfaces until the entire railing, fence, etc. is completely treated.

By confining the spray the same is not discharged into the atmosphere where it can cause harm and damage to adjacent structures or the like. Thereafter the collected spray is dispensed from the trough 13 via opening 17 having a closure means 18 (FIG. 3A), which can optionally be a plug, sliding valve 18, etc. or, alternatively, a hose 19 may be utilized for continually draining the collected fluid therefrom for disposal or reuse.

Figure 3B:
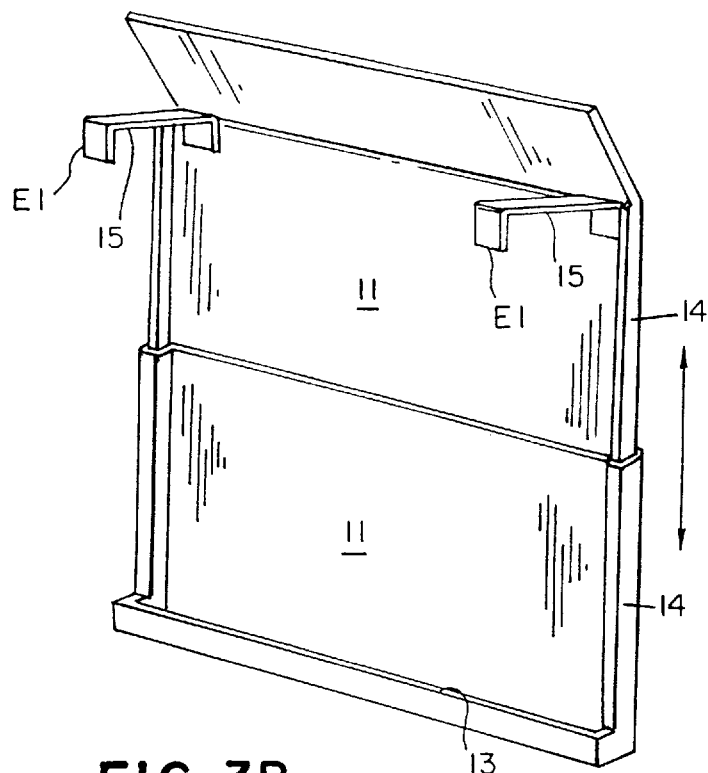
FIG. 3B shows a view of a further embodiment wherein the shield can be made of telescoping sections.
Figure 3A:
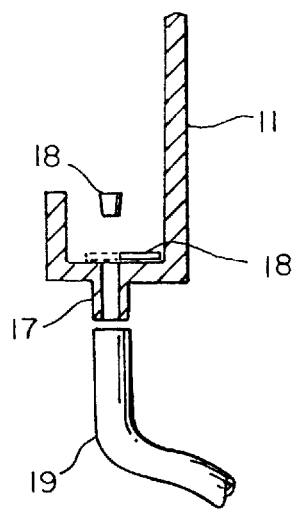
FIG. 3A is a sectional view showing details of the trough and the discharge opening.

The shield 10 of FIGS. 1, 2 and 3 is designed for heavy-duty use which encompasses continual commercial reuse and is fabricated from steel, tin, aluminum, or any other heavy-duty material. A further modification is seen in FIG. 3B wherein the shield is made from sections which can be readily extended to compensate for varying length of surfaces to be treated. As seen, the shield is fabricated from several like sheets 11,11 with the peripheral flanges 14,14 of each sheet being in telescoping frictional engagement whereby one sheet can be extended relative to the other.

Figure 4:
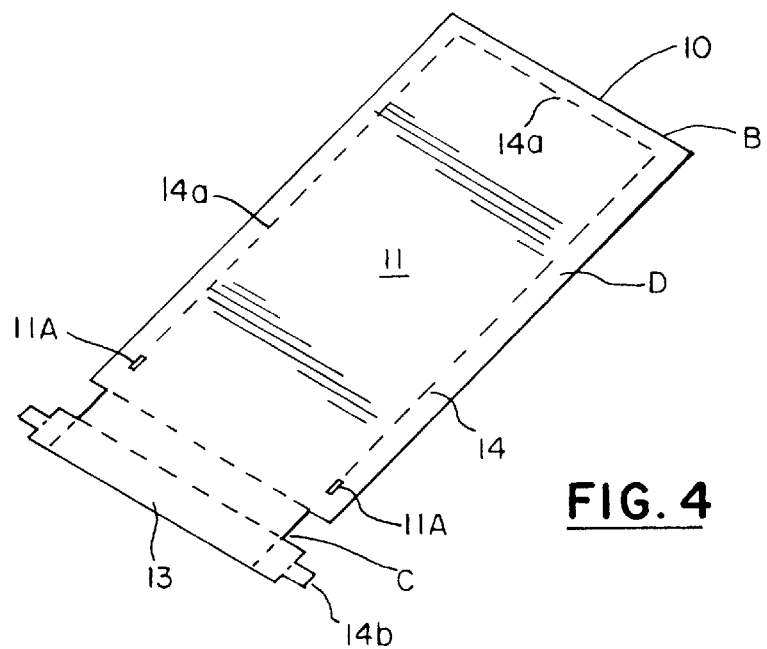
FIG. 4 shows a further embodiment of the shield and a blank from which it is formed.
Figure 4A:
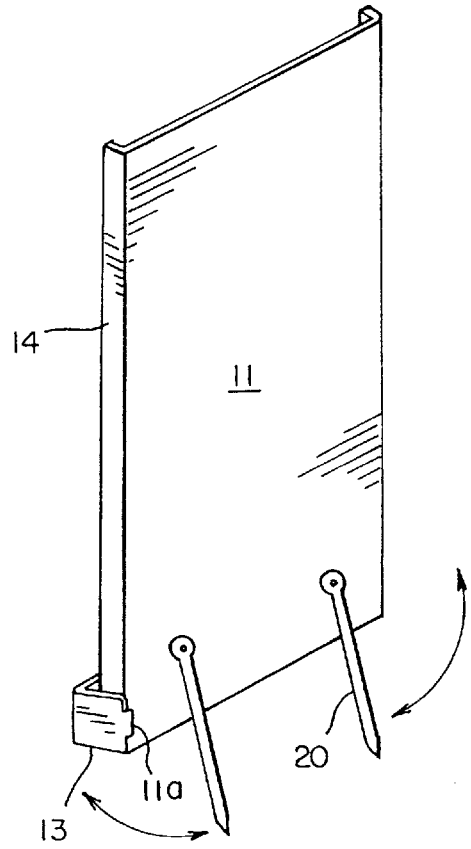
FIG. 4A shows an erected view of the blank of FIG. 4.

Alternatively, the shield can be made of readily disposable material such as cardboard, plastic, etc. and, as seen in FIG. 4, the shield 10 is formed from a cardboard blank having a major surface 11 with scored edges 14a disposed inwardly and around the peripheral edges whereby the same can be folded therealong to form the top section B, flanges D, and trough C. The formation of the trough is formed by bending the two sections and can be held in place by inserting the tabs 14b into the accommodating slots 11a or by stapling the same to the planar surface 11 as seen in FIG. 4A. In this embodiment the shield can be held in place during use by string, wire, nails, or by securing pivotal ground-engaging stakes 20,20 to the rear of the main surface 11. In this embodiment, and if desired, the shield can be coated with a material to enhance the flow of the spray downwardly into the trough.

Figure 5:
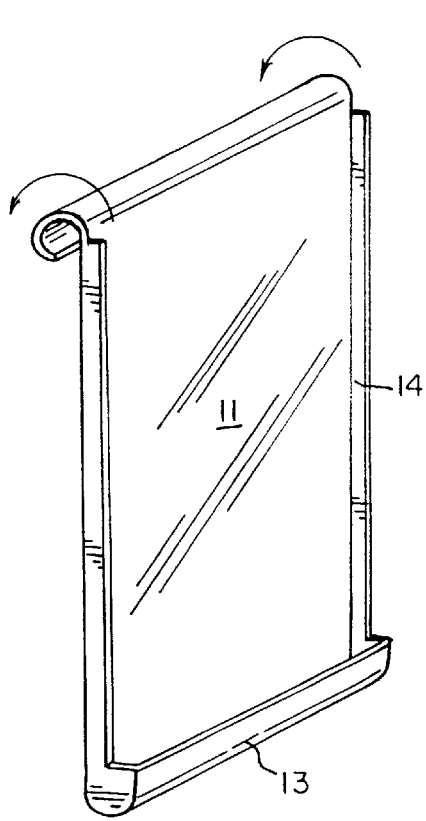
FIG. 5 shows a further embodiment of the shield formed from plastic.

As seen in FIG. 5, the shield can also be formed from a sheet of plastic with the peripheral guard means and trough already formed therein, or from a flexible sheet of plastic which will automatically reroll after the tension is removed therefrom.

As is apparent, the shield of the FIG. 4 and FIG. 5 embodiments is designed to be readily stored and/or disposed after usage and is, therefore, made from relatively inexpensive and readily available material.

It will be appreciated that the preceding descriptions and examples of the invention are examples only, and that further improvements may be apparent from this disclosure and may be resorted to without departing from the spirit of this invention, as those skilled in the art will readily understand.

I claim:

1. A method of confining and collecting excess spray/mist when treating an article, the method including the steps of:

disposing a sheet of material rearwardly of said article;

providing a support member extending outwardly of said sheet of material from a point above the lower edge of said sheet of material, for engaging a fixed support and maintaining said sheet of material in a position behind the article to be treated;

providing a trough at the lower edge of said sheet of material; and providing flanges about the remaining edges of said sheet of material, whereby the excess spray/mist will be confined and directed downwardly and over said sheet of material into said trough for disposal therefrom.

2. The method of claim 1 and further including the step of inserting the support member into said fixed support.

3. The method of claim 1 and further including the step of providing a second support member on said sheet of material aiding in the support thereof.

4. The method of claim 2 and further including the step of pivoting said support member from a collapsed to a use position.

5. The method of claim 1 and further including the step of extending the topmost flange outwardly a greater distance than the remaining flanges and disposing said flange at an angle to the sheet of material.

6. The method of claim 1 and further including the step of providing an opening in the trough for selectively draining the excess spray/mist therefrom.

7. The method of claim 1 and further including the step of collapsing the sheet material for storage purposes.

8. The method of claim 1 and further including the step of extending said sheet of material to accommodate varying dimensions of the article to be treated.

9. The method of claim 1 and further including the step of providing handles on said sheet material for handling/carrying the same.

10. The method of claim 3 and further including the step of disposing and extending said first and second support members outwardly of the top of said sheet of material and providing means thereon for engaging the fixed support.

11. The method of claim 5 and further including the step of providing a pair of support member beneath the topmost flange and providing means thereon for engaging a support.

12. The method of claim 11 and further including the step of providing handle on the topmost flange.

13. The method of claim 1, further including the step of forming the trough and flanges by bending the sheet of material.

14. The method of claim 13 and further including the step of coating the sheet of material with flow-enhancing material to facilitate the flow of spray/mist into said trough.

15. The method of claim 14 and further including the step of collapsing the sheet of material for storage purposes.

16. The method of claim 13, further including the step of bending the sheet of material into a U-shape to form the trough.

17. The method of claim 1, further including the step of forming the support member as an L-shaped member having a downward-extending distal end adapted to engage a substantially horizontal fixed support, such that said sheet of material hangs behind the article.

18. The method of claim 17, further including the step of providing a pivotal support member on a side of said sheet of material opposite a side from which said support member extends, said pivotal support member pivoting between a collapsed position and a use position.

19. The method of claim 1, further including the step of forming the sheet of material as a substantially planar sheet.

* * * * *